Patented Dec. 15, 1931

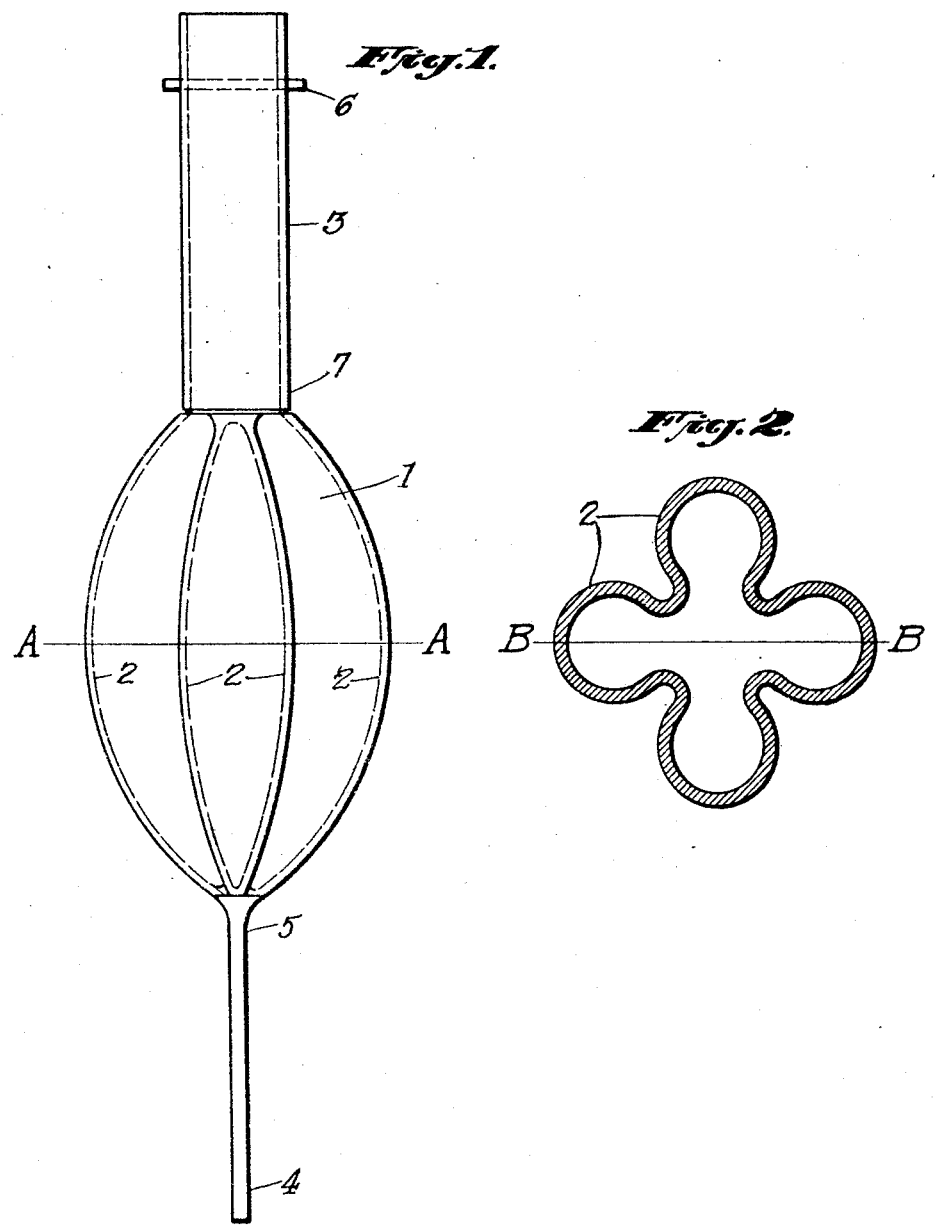

1,836,997

UNITED STATES PATENT OFFICE

GEOFFREY WILLIAM TROBRIDGE, SUTTON COLDFIELD, ENGLAND, ASSIGNOR TO DUNLOP RUBBER COMPANY LIMITED, OF BIRMINGHAM, ENGLAND, A CORPORATION OF GREAT BRITAIN

CORE FOR MOLDING HOLLOW RUBBER ARTICLES

Application filed December 28, 1929, Serial No. 417,050, and in Great Britain January 23, 1929.

This invention is concerned with improvements in or relating to cores for molding hollow rubber articles by dipping, and has particular reference to the cores used in the making of distensible bladders such as football bladders.

Among the objects of this invention is the provision of a core which shall be robust and durable and shall be so shaped as to facilitate the stripping of the deposited rubber and shall render possible an improved product.

Another object of the invention is the provision of a core presenting a cross section having rounded outlines whereby the ratio of wetted circumference to stripping circumference is a maximum.

Another object of the invention is to provide a core by means of which it shall be possible to make distensible bladders having integral inflating tubes of substantial length which may be thickened or reinforced as described in our copending application Serial No. 416,869, filed Dec. 27, 1929.

According to this invention, I provide nonfusible cores for molding hollow rubber articles, the cores being formed both with extensions for manipulating the core and with extensions for forming tubes integral with the article.

The cores are preferably longitudinally fluted and are preferably cast of a silicon aluminum alloy, but may also be made wholly or in part from stainless steel and may be of hollow formation to contain or afford passage for an electric or other fluid whereby temperature control may be effected where required.

The shape of the lower projection is dependent upon the shape and diameter of the rubber pipe which is integral with the bladder, and that near the upper end is large enough for general manipulation, but not larger than is consistent with the necessary mechanical strength and the ability to strip the deposit from the core without permanent distortion.

In order that my invention may be more clearly understood and readily carried into effect, the same will now be described with reference to the accompanying drawings.

In the drawings:—

Fig. 1 is a side elevation of the core; and
Fig. 2 is a cross-sectional plan view on the line A—A in Fig. 1.

The core is formed of a body portion 1 formed with longitudinal flutes 2 having rounded edges.

The handle 3 may be cast integral with the body 1 as shown, and the tube forming extension 4 may be similarly formed with the body, but is preferably screwed to the body at the part 5 thereby facilitating replacement when bent or broken.

The handle 3 may be provided with a locking pin 6 whereby the core may be supported, but the handle may be otherwise formed where required.

The interior of the core is preferably hollow, so that pipes or wires conducting fluid or electric current for temperature controlling purposes may be introduced as necessary.

The core is preferably grooved at 7 to provide an immersion depth mark.

By referring to Fig. 2 it will be seen that we have attained a comparatively small length stripping diameter B—B as compared to the length of the wetted surface corresponding to the total external distance around the flutes, and furthermore that the curvature of such flutes is such that the deposit is not liable to be torn on being pulled away therefrom.

The stalk also ensures that entry and exit from the dipping bath is made gradually and that the deposit is more even.

While I have described quite specifically the embodiments of the invention herein illustrated it is not to be construed that I am limited thereto since various modifications may be made without departing from the invention as defined in the appended claims.

What I claim is:

1. A core for forming bladders for footballs and similar articles from rubber material, which comprises a central body portion of nonfusible material having a handle portion at one end and a stem of smaller diameter at the opposite end and having flutings extending from said handle to said stem portion, said body between the grooves of said flutings being of a circular curvature in cross-section and enlarged in a gradual curve between said handle and said stem.

2. A core for forming bladders for footballs and similar articles from rubber material, which comprises a central body portion of nonfusible material having a handle portion at one end and a stem of smaller diameter at the opposite end and having flutings extending from said handle to said stem portion, said body between the grooves of said flutings being of a circular curvature in cross-section and enlarged in a gradual curve between said handle and said stem and having a groove extending about the junction of said handle to said main body portion to provide an immersion depth mark.

In witness whereof I have hereunto signed my name.

GEOFFREY WILLIAM TROBRIDGE.